(No Model.) 2 Sheets—Sheet 1.
C. M. BROOKS.
ATTACHMENT FOR BICYCLE FRAMES.
No. 570,536. Patented Nov. 3, 1896.
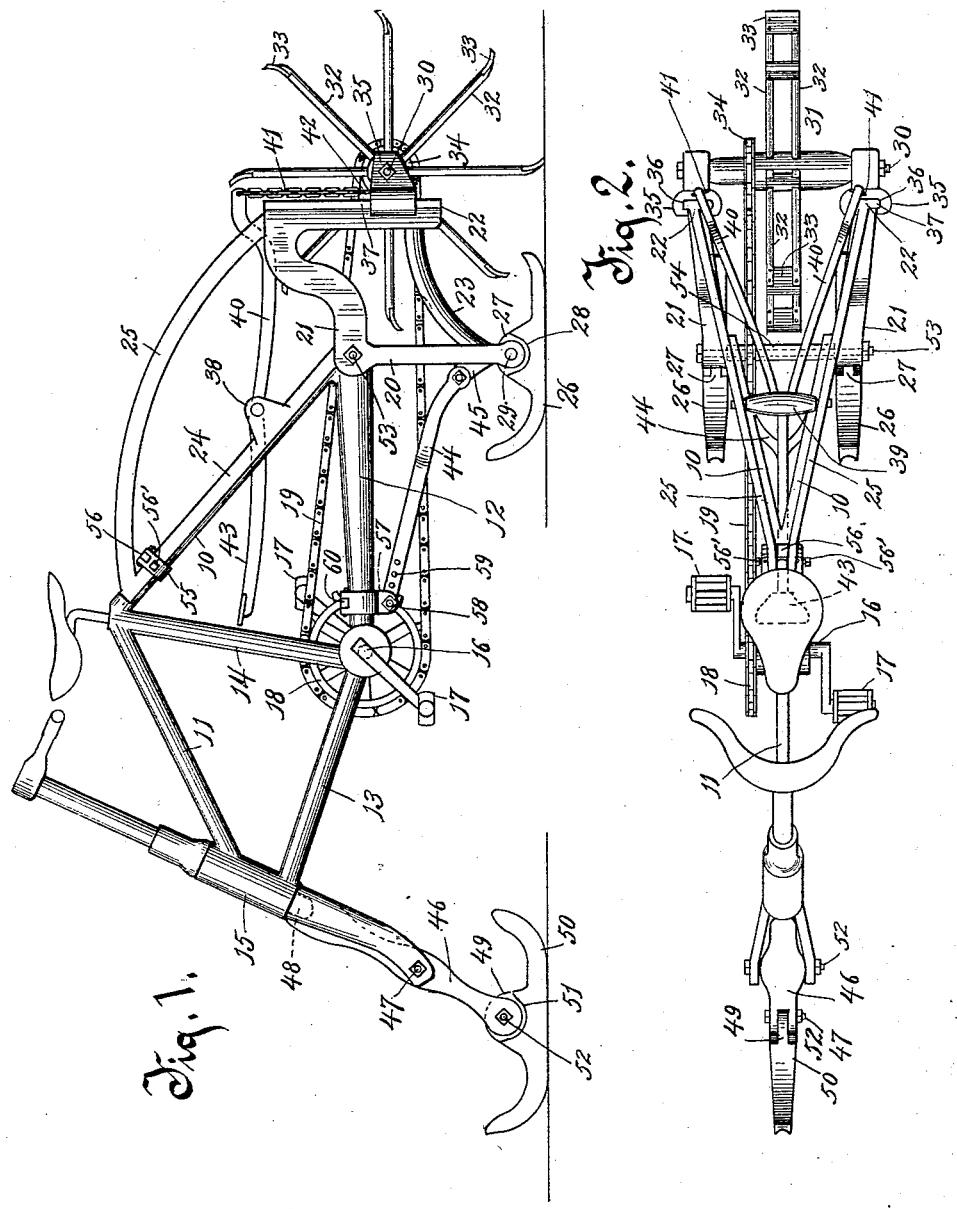
Witnesses.
Inventor.
Clarence M. Brooks.
By Benedict and Morsell
Attorneys.

(No Model.) 2 Sheets—Sheet 2.
C. M. BROOKS.
ATTACHMENT FOR BICYCLE FRAMES.
No. 570,536. Patented Nov. 3, 1896.
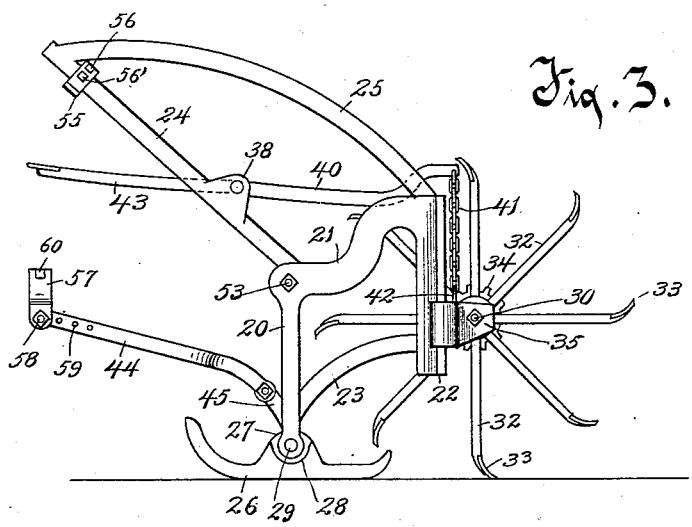
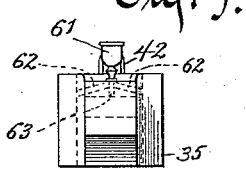
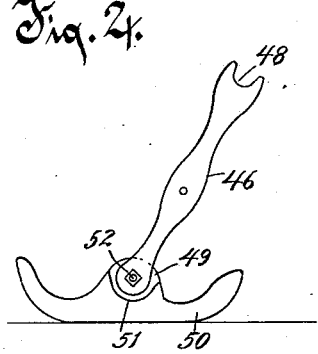
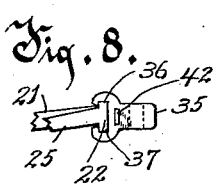
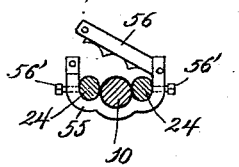
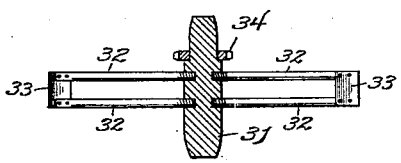
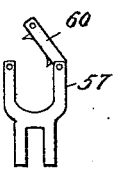
Witnesses.
C. H. Keeney.
Anna V. Faust.
Inventor.
Clarence M. Brooks.
By Benedict & Morsell
Attorneys.
THE NORRIS PETERS CO., PHOTO-LITHO., WASHINGTON, D. C.

UNITED STATES PATENT OFFICE.

CLARENCE M. BROOKS, OF OCONTO, WISCONSIN.

ATTACHMENT FOR BICYCLE-FRAMES.

SPECIFICATION forming part of Letters Patent No. 570,536, dated November 3, 1896.

Application filed February 6, 1896. Serial No. 578,216. (No model.)

*To all whom it may concern:*

Be it known that I, CLARENCE M. BROOKS, of Oconto, in the county of Oconto and State of Wisconsin, have invented a new and useful Improvement in Attachments for Bicycle-Frames, of which the following is a description, reference being had to the accompanying drawings, which are a part of this specification.

My invention has relation to improvements in attachments to bicycle-frames.

The object is to provide a simple auxiliary frame adapted, after the wheels of a bicycle have been removed from the main frame, to be readily adjusted to said main frame, so as to convert a road-bicycle into an ice-bicycle for propulsion over an icy or snowy surface.

The invention contemplates a simple and enduring construction capable of being adjusted to the main frame of a bicycle with the least possible trouble and loss of time.

In the accompanying drawings, Figure 1 is a side elevation of a bicycle-frame equipped with my attachment. Fig. 2 is a plan view of Fig. 1. Fig. 3 is a side elevation of the complete attachment excepting that for the front fork of the machine. Fig. 4 is a detail of the attachment for the front fork. Fig. 5 is a sectional view through the hub of the propelling-wheel. Fig. 6 is a detail view of the clamp for the inclined braces of the attachment. Fig. 7 is a detail view of the lower clamp. Fig. 8 is a plan view of one of the sliding boxes in connection with a fragment of the frame; and Fig. 9 is an elevation of one of the sliding boxes and its guideway, showing said sliding box fitted with an oil-cup and provided with passages leading to the grooves of the guideway and to the axle-bearing.

Referring to the drawings, the upper portion of the frame of the machine is shown as consisting of two rearwardly-inclined braces 10 10 and a forward-inclined brace 11, while the lower portion of the frame consists of the rear braces 12 12 and the forward brace 13. These upper and lower sections of the frame are connected by a vertical brace 14. The numeral 15 indicates the front brace or rod, at the lower end of which is mounted in the usual manner the front wheel of the machine. (Not shown.) The rear wheel of the machine (also not shown) is mounted between the rear converging ends of the respective sets of braces 10 and 12. Mounted centrally in the lower portion of the frame is the usual driving-axle 16, provided on opposite ends with the foot-treadles 17 17, and also having mounted thereon a sprocket-wheel 18, around which passes the sprocket-chain 19, which leads to the rear sprocket of the rear wheel of the bicycle.

Referring now particularly to the attachment, the numerals 20 20 indicate two vertical legs, which are advisably inclined outwardly toward their lower ends, so as to afford a wide base for the runners. Extending rearwardly from the upper ends of these legs are arms 21 21, which arms at their rear ends are provided with depending guideways 22 22, the lower ends of said guideways being connected with the lower portions of the legs by means of brace-rods 23 23. Extending forwardly from the upper ends of the legs, at an upward incline, are arms 24 24. The upper extremities of these arms are connected with the upper ends of the vertical guideways by means of curved braces 25 25. To the lower ends of the legs are pivoted runners 26 26. These runners, as shown in Fig. 2, preferably have their under sides concave. From the upper side of each runner extends upwardly a lug 27, said lug being of less width than the width of the runner and bounded upon each side at its lower portion with a rounded shoulder 28. The lower end of each vertical leg 20 is bifurcated, and this bifurcated portion straddles the lug 27, the furcate part of each leg being of such width as to bring the opposite side surfaces of the leg flush with the opposite side surfaces of the runners, so that no lateral projection is left to retard in any manner the speed of the machine. The furcate part is pivoted to the lug by means of a pivot-pin 29.

The rear axle of the attachment is indicated by the numeral 30. Upon this axle is mounted the hub 31 of the propelling-wheel. The spokes of this propelling-wheel each consists of two arms 32 32, which are connected at their outer ends by means of a flat curved or inclined chisel-shaped blade 33. The hub and arms of the spokes may be of metal, and in such case the spoke-arms can be conveniently connected to the hub by threading the inner ends of said arms and engaging said threaded ends with threaded recesses of the hub, as clearly shown in Fig. 5. Any other suitable connection, however, may be employed which will provide for readily disconnecting the arms of the spokes from the hub, and provision should also be made for readily disconnecting the blades from the arms of the spokes, so that all of these several parts may at any time be readily disconnected and replaced by other similar parts when occasion demands it. The blades are shown in the drawings as connected to the arms by means of bolts or pins. In case a wooden wheel is preferred, then of course the metal hub and spokes can be substituted by a wooden hub and spokes.

The hub of the propelling-wheel has also mounted thereon a sprocket-wheel 34, around which the sprocket-chain 19 passes and by means of which rotation is imparted to the propelling-wheel. The ends of the rear axle 30 have their bearings in sliding journal-boxes 35 35. The side edges of the front faces of these boxes are bent around into hook shape to form lateral vertical grooves 36 36. These grooves are adapted to receive flanges 37, projecting laterally from the ends of the guideways 22. Journaled in lugs 38 38, projecting upwardly from the arms 24, is a hub 39. Extending rearwardly from this hub are two arms 40 40, the rear ends of said arms being directly above the upper ends of the journal-boxes. Chains 41 41 connect these rear ends of the arms with staples 42 42 driven in the journal-boxes. Extending forwardly from the hub 39 is a foot-treadle 43, the free end of which, when the attachment is adjusted to the frame of a bicycle, being located just below the seat or saddle of the machine in convenient position to be operated by the foot of the rider. It is obvious that by depressing this lever the rear ends of the arms 40 40 will be raised, and consequently the journal-boxes 35 also raised, and the propelling-wheel thereby elevated out of contact with the surface traveled over.

The numeral 44 indicates an arm having a forked rear end, the separate members of this fork being pivoted to lugs 45 45, projecting forwardly from the legs 20.

That part of the attachment which is connected to the front bar or rod 15 of the bicycle-frame consists of a leg 46, which is adapted to fit in between the furcate parts of the lower end of said rod or bar 15 and to be bolted at a medial point between the ends of said furcate parts by a transverse bolt 47. The upper end of this leg is provided with a rounded recess 48, adapted to receive the lower end or a projection from the lower end of the handle-bar rod, to prevent the leg 46 from swinging on the bolt 47. The lower end of this leg 46 is bifurcated, and between the furcate parts is received an upwardly-extending lug 49 from a front runner 50. The sides of this lug are cut away, as is the case with the lugs of the rear runners, so as to bring the sides of the leg 46 flush with the sides of the main portion of the runner, so as to provide against any lateral projection of the parts. At the lower end of the lugs are also provided rounded shoulders 51 on each side of said lug. These shoulders provide for the front runner turning freely on its pivot 52, and the same function is subserved by the similar shoulders 28 of the rear runners. The under side of the front runner is also preferably concave, conforming in this respect to the conformation of the rear runners.

Fig. 3 shows the rear portion of the attachment removed from the bicycle-frame. Now, when it is desired to adjust this attachment to the frame of a bicycle, all that is necessary to be done is to remove the front and rear wheels of said bicycle and substitute therefor the front and rear portions of the attachment. The front portion of the attachment is adjusted in the manner just explained. In order to connect the rear portion, the attachment is arranged adjacent to the frame of the bicyle in a position to bring the arms 24 24 parallel with the outer sides of the rear inclined braces 10 of the bicycle-frame. A transverse bolt 53 is now passed through openings in the angles between the vertical legs 20 and the arms 21, extending rearwardly therefrom, said bolt also passing through the openings in the bicycle-frame which formed the bearings for the axle of the rear bicycle-wheel. A sleeve 54 advisably encircles this bolt between the braces of the bicycle-frame for the purpose of keeping the ends of the frame diverged. The arms 24 24 are secured to the braces 10 10 by means of a clamping device 55, said clamping device being disposed at a point where the braces 10 10 merge into a single brace. This clamping device consists of a lower substantially U-shaped piece having its bottom formed into a series of concavities to conform to the shape of the arms 24 and to the shape of the merged braces 10. A top piece 56 is pivoted to one of the upwardly-extending portions of this U-shaped clamp, and is provided upon its under side with a series of concavities which register with the concavities of the lower portion of the clamp, thereby also conforming the pivoted top piece to the shape of the several arms and brace. The free end of the top piece is locked by means of a pin passing through the same and through the upwardly-extending piece of the lower U-shaped portion of the clamp. Set-screws 56' 56' are also advisably provided for the purpose of more securely locking the clamp.

The arm 44 is also connected to the main frame of the bicycle by means of a clamp 57, said clamp consisting of a U-shaped upper portion and a lower bifurcated portion. This lower bifurcated portion straddles the forward end of the arm 44, and is adapted to be secured adjustably thereto by means of a bolt 58, passing through any of the series of apertures 59 in the extremity of arm 44. The upper U-shaped portion of this clamp is adapted to embrace the portions of the braces 12 12 where they merge into a single piece just back of the driving-axle. The U-shaped upper portion has also pivoted thereto a top piece 60, which is adapted to be thrown down over the brace, having a concave formation on its under side to adapt it to the shape of the brace. The free extremity of said top piece is locked by means of a suitable locking-pin. The attachment is now securely locked and adjusted to the main bicycle-frame, and all that remains to be done is to connect the sprocket-wheel of the main driving-axle to the sprocket-wheel 34 of the rear axle by means of the sprocket-chain 19.

It will be seen that the whole attachment is secured in place merely by the employment of the transverse bolt 53 and the clamping devices 55 and 57.

It is obvious that in order to remove the attachment all that is necessary is to take out this bolt 53 and unlock the two clamps.

A bicycle-frame equipped with my attachment provides an efficient ice-bicycle, comparatively light in weight and capable of rapid propulsion over the surface traveled. It comprehends a most improved form of propelling-wheel in which the parts can be readily replaced by others when worn out or otherwise impaired, and it furthermore comprehends a most simple and convenient means for adjusting the propelling-wheel, whereby its position with reference to the surface traveled over may be readily regulated merely by operating the foot-treadle.

It is evident that the machine can be successfully propelled in any amount of loose snow up to the length of the spokes, which in practice will be thirteen inches, more or less.

In Fig. 9 of the drawings I show a convenient arrangement for lubricating the guideways for the sliding boxes, and also the axle of the propelling-wheel. This consists in providing at the upper end of each sliding box an oil-cup 61. Extending from the discharge-opening of this oil-cup, laterally in opposite directions, are passages 62 62, which lead to the guideways. A vertical passage 63 extends to the opening in the journal-box for the end of the axle. It will be seen from this that the parts where the greatest friction occurs are at all times automatically supplied with lubricant.

What I claim as my invention, and desire to secure by Letters Patent, is—

1. In combination with a bicycle-frame, of an auxiliary frame, consisting of legs having runners at their lower ends, an axle journaled on projecting parts of the legs, a propelling-wheel mounted on said axle, means for driving said wheel from the driving-axle of the bicycle, and means for securing the auxiliary frame to the bicycle-frame.

2. An attachment for bicycle-frames, consisting of legs having runners at their lower ends, vertical guideways, extending downwardly from projecting parts of the legs, journal-boxes mounted slidingly in the guideways, means for sliding said boxes in the ways, an axle mounted in the boxes, and a propelling-wheel mounted on the axle.

3. An attachment for bicycle-frames, consisting of an auxiliary frame provided with depending legs, said legs having runners at their lower ends, a lever pivoted to the auxiliary frame, vertical guideways forming a part of the auxiliary frame, journal-boxes slidingly mounted in the guideways, a connection between the end of the lever and the boxes, an axle journaled in the boxes, and a propelling-wheel mounted on the axle.

4. An attachment for bicycle-frames, consisting of an auxiliary frame, comprising vertical legs having runners at their lower ends, forwardly-extending upwardly-inclined arms, rearwardly-projecting arms, a rear axle mounted in said rearwardly-projecting arms, and a propelling-wheel on said rear axle.

5. An attachment for bicycle-frames, consisting of an auxiliary frame, comprising vertical legs having runners at their lower ends, forwardly-extending upwardly-inclined arms adapted to be secured to the rear inclined braces of a bicycle-frame, a forwardly-extending pivoted brace, the forward end thereof adapted to be secured to the lower portion of the bicycle-frame, rearwardly-projecting arms, a rear axle mounted on said rearwardly-projecting arms, and a propelling-wheel on said rear axle.

6. An attachment for bicycle-frames, consisting of an auxiliary frame, comprising vertical legs having runners at their lower ends, forwardly-extending upwardly-inclined arms, rearwardly-extending arms having guideways depending therefrom, journal-boxes mounted slidingly on said guideways, means for sliding said boxes, a rear axle mounted in the boxes, and a propelling-wheel on the rear axle.

7. An attachment for bicycle-frames consisting of an auxiliary frame comprising vertical legs having runners at their lower ends, forwardly-extending upwardly-inclined arms, rearwardly-extending arms having guideways depending therefrom, braces connecting these guideways with the vertical legs, other braces connecting the upper portion of the guideways with the forwardly-extending upwardly-inclined arms, journal-boxes slidingly mounted on the guideways, a rear axle journaled in the boxes, and a propelling-wheel mounted on the axle.

8. An attachment for bicycle-frames, consisting of an auxiliary frame comprising vertical legs having runners at their lower ends, forwardly-extending upwardly-inclined arms, rearwardly-extending arms having guideways depending therefrom, journal-boxes slidingly mounted on the guideways, a rear axle journaled in the boxes, a propelling-wheel mounted on the axle, and a forwardly-extending brace having a forked rear end connected to the vertical legs.

9. An attachment for bicycle-frames, consisting of an auxiliary frame comprising vertical legs having runners at their lower ends, forwardly-extending upwardly-inclined arms, rearwardly-extending arms having guideways depending therefrom, journal-boxes slidingly mounted on the guideways, a rear axle journaled in the boxes, a propelling-wheel mounted on the axle, a hub or shaft mounted between the forwardly-extending upwardly-inclined arms, arms extending rearwardly from this hub or shaft, chains connecting the rear ends of these arms with the journal-boxes, and a foot-treadle extending forwardly from the hub or shaft.

10. In combination with the frame of a bicycle, of an attachment consisting of an auxiliary frame comprising vertical legs having runners at their lower ends, forwardly-extending upwardly-inclined arms adjacent to the rear inclined braces of a bicycle-frame, rearwardly-extending arms a rear axle mounted thereon, a propelling-wheel mounted on the axle, a bolt for connecting the auxiliary frame to the bicycle-frame, said bolt adapted to pass through the frames, a clamp for connecting the forwardly-extending upwardly-inclined arms of the auxiliary frame to the rear inclined brace or braces of the bicycle-frame, and a connection between the driving-axle of the bicycle and the propelling-wheel.

11. In combination with the frame of a bicycle, of an attachment consisting of an auxiliary frame comprising vertical legs having runners at their lower ends, forwardly-extending upwardly-inclined arms, rearwardly-extending arms, a rear axle mounted thereon, a propelling-wheel mounted on the axle, a clamp for connecting the forwardly-extending upwardly-inclined arms of the auxiliary frame to a brace or braces of the bicycle-frame, a pivoted forwardly-extending arm connected to the auxiliary frame, a clamp for connecting this arm to the bicycle-frame, a bolt for connecting the auxiliary frame to the bicycle-frame, and a connection between the driving-axle of the bicycle and the propelling-wheel.

12. In combination with the frame of a bicycle, of an attachment consisting of an auxiliary frame comprising vertical legs having runners at their lower ends, forwardly-extending upwardly-inclined arms, rearwardly-extending arms, a rear axle mounted thereon, a propelling-wheel mounted on the axle, a clamp for connecting the forwardly-extending upwardly-inclined arms to a brace or braces of the bicycle-frame, a pivoted forwardly-extending arm connected to the auxiliary frame, a clamp connected to a part of the bicycle-frame and adjustably connected to this forwardly-extending pivoted arm, a bolt for connecting the auxiliary frame to the bicycle-frame, and a connection between the driving-axle of the bicycle and the propelling-wheel.

13. The combination, of a front bar or rod of a bicycle-frame, provided with a bifurcated lower end, said rod or bar also provided with a lug projecting downwardly between the upper ends of the furcate parts, a leg passing upwardly between the furcate parts, and having its upper end recessed to receive the downwardly-extending lug, a pivot-pin passing through the lower ends of the furcate parts of the front bar or rod and through a medial point of the leg, and a runner at the lower end of the leg.

In testimony whereof I affix my signature in presence of two witnesses.

CLARENCE M. BROOKS.

Witnesses:
T. H. PHELPS,
W. H. YOUNG.